United States Patent [19]

Fling

[11] Patent Number: 4,810,052

[45] Date of Patent: Mar. 7, 1989

[54] FIBER OPTIC BIDIRECTIONAL DATA BUS TAP

[75] Inventor: John J. Fling, Malibu, Calif.

[73] Assignee: Litton Systems, Inc, Beverly Hills, Calif.

[21] Appl. No.: 816,808

[22] Filed: Jan. 7, 1986

[51] Int. Cl.$^4$ .............................................. G02B 6/28

[52] U.S. Cl. .......................... 350/96.16; 350/96.15; 455/612

[58] Field of Search ............... 350/96.15, 96.16, 96.29, 350/96.30; 455/610, 612; 250/227

[56] References Cited

U.S. PATENT DOCUMENTS

| | | | |
|---|---|---|---|
| 4,166,946 | 9/1979 | Chown et al. | 350/96.16 X |
| 4,301,543 | 11/1981 | Palmer | 350/96.15 X |
| 4,307,933 | 12/1981 | Palmer et al. | 350/96.15 X |
| 4,315,666 | 2/1982 | Hicks, Jr. | 350/96.15 |
| 4,317,614 | 3/1982 | Palmer | 350/96.16 |
| 4,325,636 | 4/1982 | Schiffner | 356/350 |
| 4,398,794 | 8/1983 | Palmer et al. | 350/96.19 |
| 4,431,260 | 2/1984 | Palmer | 350/96.15 |
| 4,461,536 | 7/1984 | Shaw et al. | 350/96.15 |
| 4,462,699 | 7/1984 | Shaw et al. | 374/131 |
| 4,490,163 | 12/1984 | Jochem et al. | 350/96.15 X |
| 4,550,974 | 11/1985 | Murphy | 350/96.15 |
| 4,553,811 | 11/1985 | Becker et al. | 350/96.24 |
| 4,553,814 | 11/1985 | Bahl et al. | 350/96.21 |
| 4,556,279 | 12/1985 | Shaw et al. | 350/96.15 |
| 4,557,553 | 12/1985 | McLandrich | 350/96.15 |
| 4,558,920 | 12/1985 | Newton et al. | 350/96.15 |
| 4,564,262 | 1/1986 | Shaw | 350/96.15 |
| 4,564,417 | 1/1986 | Schoen et al. | 156/633 |
| 4,569,569 | 2/1986 | Stewart | 350/96.19 |
| 4,575,180 | 3/1986 | Chang | 350/96.15 |
| 4,575,183 | 3/1986 | Parchet et al. | 350/96.22 |
| 4,581,530 | 4/1986 | Brogardh et al. | 350/96.29 X |
| 4,586,783 | 5/1986 | Campbell et al. | 350/96.15 |
| 4,586,784 | 5/1986 | Tremblay et al. | 350/96.15 |
| 4,588,256 | 5/1986 | Onstott et al. | 350/96.21 |
| 4,589,725 | 5/1986 | Dyott | 350/96.15 |
| 4,591,237 | 5/1986 | Laude | 350/96.15 |
| 4,591,372 | 5/1986 | Bricheno et al. | 65/4.2 |
| 4,593,988 | 6/1986 | Giallorenzi | 350/96.15 |
| 4,595,839 | 6/1986 | Braun et al. | 250/551 |
| 4,601,535 | 7/1986 | Tanaka et al. | 350/96.20 |
| 4,601,541 | 7/1986 | Shaw et al. | 350/320 |
| 4,611,884 | 9/1986 | Roberts | 350/96.15 |
| 4,632,513 | 12/1986 | Stowe et al. | 350/320 |
| 4,634,218 | 1/1987 | Hicks, Jr. | 350/96.30 |

FOREIGN PATENT DOCUMENTS

| | | | |
|---|---|---|---|
| 2473188 | 7/1981 | France | 350/96.16 |
| 2533714 | 9/1982 | France | |
| 5090599 | 2/1977 | Japan | |
| 52-14430 | 3/1977 | Japan | |
| 53-6052 | 1/1978 | Japan | |
| 52-74442 | 7/1978 | Japan | |
| 53-91752 | 11/1978 | Japan | |
| 54-126058 | 9/1979 | Japan | |
| 54-118255 | 9/1979 | Japan | |
| 54-101334 | 9/1979 | Japan | |
| 58-211119 | 12/1983 | Japan | 350/96.15 |

OTHER PUBLICATIONS

R. A. Bergh, M. J. F. Digonnet, H. C. Lefevre, S. A. Newton, and H. J. Shaw, Single Mode Fiber Optic Components.

Kapany et al., "Coherent Interactions Between Optical Waveguides and Lasers", Journal of the Optical Society of America, 1968, vol. 58, No. 9, pp. 1176+.

*Primary Examiner*—John D. Lee
*Attorney, Agent, or Firm*—Lynn & Lynn

[57] ABSTRACT

A fiber optic data bus tap includes a tap coupler for coupling signals traveling in either direction in a data bus fiber into one of two lengths of a tap fiber. The signals are then guided to a receiver. The tap fiber may include a fiber optic coupler formed between the two lengths thereof for splitting the signal coupled from the data bus between the two lengths of the tap fiber so that they both carry the same information. The receiver is couple to one of the two lengths of the tap fiber. One of the lengths of the tap fiber may terminate in a mirror so that signals are reflected back to the tap coupler where a portion of the reflected signal is transmitted to the receiver. A transmitter may be coupled to the power splitter for supplying signals to the tap fiber for input to the data bus. The system may employ a light emitting diode as a transceiver instead of having a separate receiver and transmitter.

12 Claims, 3 Drawing Sheets

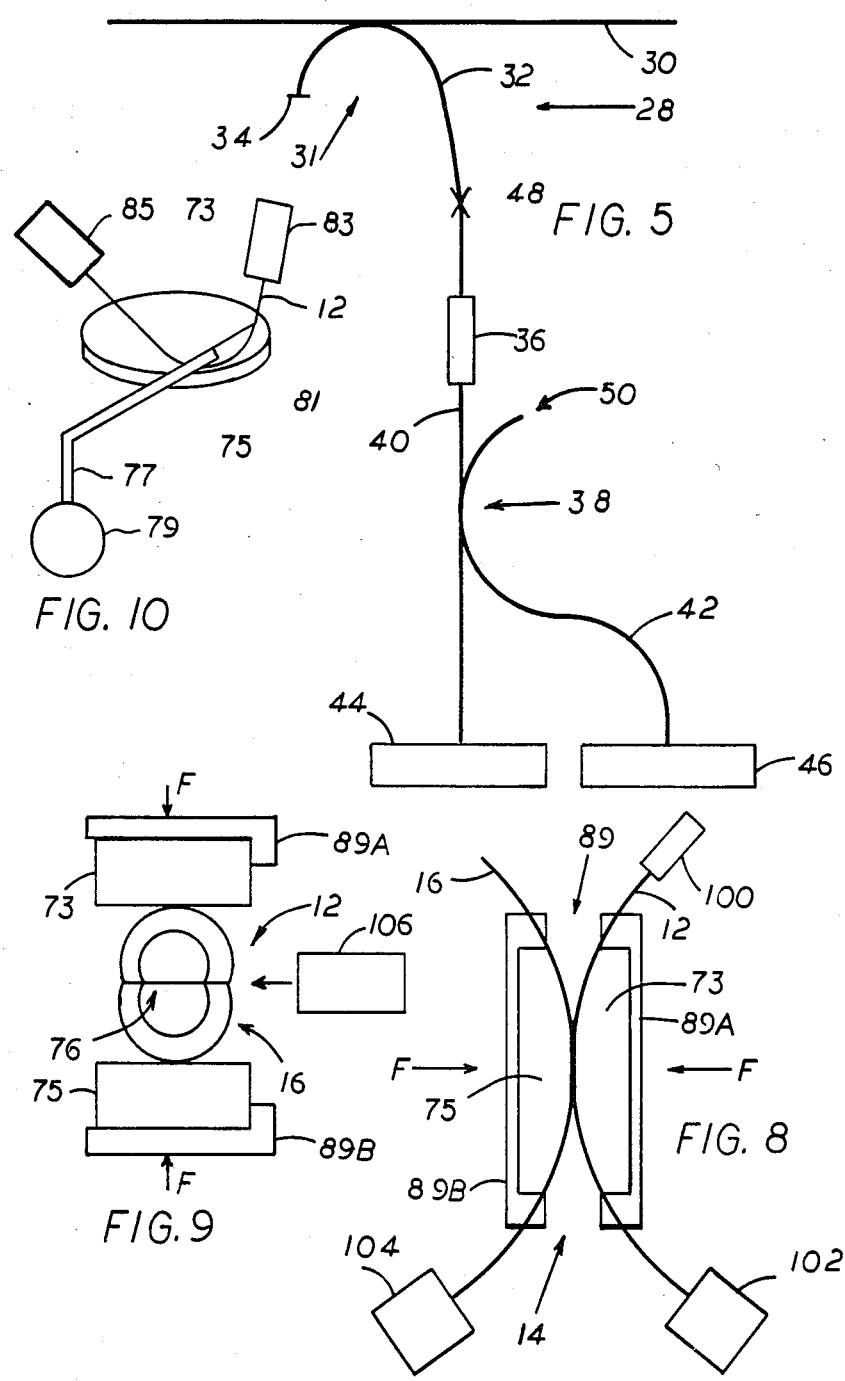

FIBER OPTIC BIDIRECTIONAL DATA BUS TAP

BACKGROUND OF THE INVENTION

This invention relates generally to data buses and particularly to taps for carrying signals to and from data buses. Still more particularly, this invention relates to taps for carrying signals to and from fiber optic data buses.

Optical fiber provides significant advantages over other wave guide means in the amount of information that may be transmitted. Since optical signals guided by optical fiber have frequencies much greater than other guided waves, optical fiber provides more frequency bands, or channels, in which a carrier signal may be modulated to transmit information. Light signals carried by optical fiber are less susceptible to environmental interferences than electromagnetic signals of lower frequency carried by wires or other types of waveguides.

Difficulty arises in constructing a practical multistation data bus that could be accessed by a multiplicity of users because of the relatively high losses of fiber optic couplers required to couple signals to and from the data bus. Prior fiber optic data buses have the disadvantage of providing only one way transmission of data and therefore require a complete loop of optical fiber in order to form an interactive network between user stations or between systems of sensors and control devices connected to such data buses.

Some familiarity with the propagation characteristics of light within an optical fiber will facilitate an understanding of both the present invention and the prior art. Therefore, a brief discussion of fiber optic waveguides, normal modes of propagation of light in such waveguides and polarization of light is presented.

The behavior of an optical wave at an interface between two dielectric materials depends upon the refractive indices of the two materials. If the refractive indices of the two dielectrics are identical, then the wave propagates across the interface without experiencing any change. In the general case of different refractive indices, however, there will be a reflected wave, which remains in the medium in which the wave was first propagating, and a refracted wave, which propagates beyond the dielectric interface into the second material. The relative intensities of the reflected and refracted waves depend upon the angle of incidence and the difference between the refractive indices of the two materials. If an optical wave originally propagating in the higher index material strikes the interface at an angle of incidence greater than or equal to a critical angle, there will be no refracted wave propagated across the interface; and essentially all of the wave will be totally internally reflected back into the high index region. An exponentially decaying evanescent wave extends a small distance beyond the interface.

Most optical fiber has an elongated generally cylindrical core of higher refractive index and a cladding of lower refractive index surrounding the core. Optical fibers use the principle of total internal reflection to confine the energy associated with an optical wave to the core. The diameter of the core is so small that a light beam propagating in the core strikes the core only at angles greater than the critical angle. Therefore, a light beam follows an essentially zig-zag path in the core as it moves between points on the core-cladding interface.

It is well-known that a light wave may be represented by a timevarying electromagnetic field comprising orthogonal electric and magnetic field vectors having a frequency equal to the frequency of the light waave. An electromagnetic wave propagating through a guiding structure can be described by a set of normal modes. The normal modes are the permissible distributions of the electric and magnetic fields within the guiding structure, for example, a fiber optic waveguide. The field distributions ar directly related to the distribution of energy within the structure.

The normal modes are generally represented by mathematical functions that describe the field components in the wave in terms of the frequency and spatial distribution in the guiding structure. The specific functions that describe the normal modes of a waveguide depend upon the geometry of the waveguide. For an optical fiber, where the guided wave is confined to a structure having a circular cross section of fixed dimensions, only fields having certain frequencies and spatial distributions will propagate without severe attenuation. The waves having field components that propagate unattenuated are the normal modes. A single mode fiber will guide only one energy distribution, and a multimode fiber will simultaneously guide a plurality of energy distributions. The primary characteristic that determines whether fiber is single mode or multimode is the ratio of the diameter of the fiber core to the wavelength of the light propagated by the fiber.

In describing the normal modes, it is convenient to refer to the direction of the electric and magnetic fields relative to the direction of propagation of the wave. If only the electric field vector is perpendicular to the direction of propagation, which is usually called the optic axis, then the wave is said to be transverse electric (TE) mode. If only the magnetic field vector is perpendicular to to the optic axis, the wave is a transverse magnetic (TM) mode. If both the electric and magnetic field vectors are perpendicular to the optic axis, then the wave is a transverse electromagnetic (TEM) mode. None of the normal modes require a definite direction of the field components; and in a TE mode, for example, the electric field may be in any direction that is perpendicular to the optic axis.

The direction of the electric field vector in an electromagnetic wave is the polarization of the wave. In general, a wave will have random polarization in which there is a uniform distribution of electric field vectors pointing in all directions permissible for each mode. If all the electric field vectors in a wave point in only one particular direction, the wave is linearly polarized. If the electric field consists of two orthogonal electric field components of equal magnitude and 45° out of phase, the electric field is circularly polarized because the net electric field is then a vector that rotates around the optic axis at an angular velocity equal to the frequency of the wave. If the two linear polarizations have unequal magnitudes and phases that are neither equal nor opposite, the wave has elliptical polarization. In general, any arbitrary polarization can be represented by either the sum of two orthogonal linear polarizations, two oppositely directed circular polarizations or two oppositely directed elliptical having orthogonal semi-major axes.

Propagation characteristics, velocity, for example, of an optical signal depend upon the index of refraction of the medium through which the light propagates. Certain materials have different refractive indices for different polarizations. A material that has two refractive indices is said to e birefringent.

Fiber optic sensors have geophysical applications for detecting acoustic signals generated in geophysical research. Fiber optic sensors find applications in other situations for detecting acoustic vibrations. Such applications may require many fiber optic sensors. In order to eliminate the necessity of having a separate strand of fiber optic material for each sensor, it is desirable to connect many separate sensors to a single data bus also formed of optical fiber. These connections are achieved with the use of fiber optic couplers.

There are four general classes of multimode couplers that have been cnsidered for constructing a multistation fiber optic data bus: (1) fused biconical couplers, (2) bulk optical couplers, (3) evanescent field couplers and (4) direct core intercept couplers. The basic structures and methods for forming these couplers are well known in the fiber optics art.

The fused biconical tapered coupler is fabricated by twisting together two fibers over a short length of one to three centimeters and then heating the twisted region together while holding the fibers under tension. The fibers partially fuse because of the heat applied thereto. The stretching process causes the fibers to taper symmetrically on each side of the heated area, which gives rise to the descriptive term "biconical".

As the fiber cross section is reduced, modes guided by the cores expand into the cladding of both fibers. This mode overlap is the source of coupling. Light ordinarily will not escape from the cladding into the surrounding environment because the index of refraction of the cladding is higher than that of air. The core has a higher refractive index than the cladding; therefore, light will cross the core-cladding interface into the core. Since the core has a higher refractive index than the cladding, most of the light previously in the cladding ordinarily will remain guided by the core.

Since the fused biconical tapered coupler depends upon mode expansion into the weakly guiding cladding area of the fibers and subsequent compression back into the normal guided core modes after the coupling region has been traversed, these couplers have the disadvantage of having high radiation losses. Such losses render this type of coupler unsuitable for forming a data bus having a great number of taps because the signal losses would be so great that no signal could be distinguished from the noise inherent in the system.

Fused biconical tapered couplers are also sensitive to the material surrounding the tapered portions of the fibers. Potting compounds exhibiting appropriate index of refraction and index stability in the presence of temperature changes are difficult to obtain. Therefore, a fully encapsulated fused biconical tapered multimode coupler generally has an insertion loss of a minimum of about 0.5 dB.

There are numerous techniques for fabricating bulk optics couplers using miniaturized bulk optics beam splitter having dimensions approaching those of optical fibers. Diffraction gratings and dichroic filters are also employed to provide coupling in devices such as wave length division multiplexers. All bulk optics couplers have the problems of high loss and high production cost, which render bulk optics couplers unsuitable for forming a multistation data bus.

Evanescent field couplers provide coupling by means of overlap of the exponentially decaying evanescent fields that surround the modes guided by the fiber cores. In single mode fiber, a significant amplitude of the evanescent field extends several microns radially outward from the core into the cladding. If most of the cladding is removed from two fibers and the resulting nearly exposed cores placed close together, the evanescent field of light guided by one fiber overlaps into the core of the adjacent fiber; and coupling occurs.

The amount of power coupled from one fiber to the other is a function of the core separation, distance over which the cores are in proximity and the mode propagation characteristics of the cores. In multimode fibers only those modes having a relatively high fraction of the energy distributed near the core/cladding boundary have evanescent fields that extend into the cladding sufficiently to cause coupling. These higher order modes carry only a small portion of the total transmitted power. Therefore, it is necessary to bring the cores of both fibers into very close proximity over a large distance to achieve any significant coupling. In practical devices, the cores must be in physical contact over a distance of one to three centimetrs. Maintaining this relation between two fiber cores to fractions of a micron under environmental conditions is extremely difficult.

The direct core intercept coupler does not employ evanescent coupling, but rather, merges the cores of the coupled fibers over relatively short interaction distances of about one to six millimeters. The coupling is proportional to the core areas intercepted and permits bonding of the interaction region 76 between fibers by fusion welding or adhesives. Previously, fully potted direct core intercept couplers, like the other couplers described above, have exhibited losses too high for forming a multiple tap data bus. It has also been difficult to maintain the fraction of enery coupled by such couplers to within specified limits satisfactory for forming a multiple tap data bus.

Still another difficulty with previous direct core intercept couplers has been the cost and time required for their manufacture. Production of a fiber optic multiport data bus at reasonable cost requires low cost, easily made couplers which will retain a specified coupling ratio when potted and exposed to environmental disturbances such as temperature fluctuations and vibrations.

SUMMARY OF THE INVENTION

The present invention provides a fiber optic data bus tap system that overcomes the disadvantages of the prior art. The fiber optic data bus tap system according to the invention provides bidirectional coupling of data from the data bus into a receiver and may also provide bidirectional coupling of signals from a transmitter into the data bus fiber. The system preferably includes low loss fiber optic directional couplers so that many data taps may be formed in a data bus.

A bidirectional fiber optic data bus system according to the invention for coupling optical signals propagating in a data bus fiber into a receiver and for bidirectional transmission of signals from a transmitter comprises a bidirectional fiber optic data bus system for coupling optical signals propagating in a data bus fiber into a receiver and for bidirectional transmission of signals from a transmitter, comprising a tap fiber, a tap fiber optic coupler formed to couple optical signals between the data bus fiber and the tap fiber, a receiver coupled to the tap fiber to receive optical signals therefrom, and means for guiding a portion of a signal incident upon the tap fiber optic coupler from either of two opposite directions in the data bus fiber to the receiver.

The guiding means of the bidirectional fiber optic data bus system according to the invention may may include a first length of the tap fiber extending from the tap coupler for guiding signals propagating in a first direction in the data bus fiber from the tap coupler, a second length of the tap fiber extending from the tap coupler for guiding signals propagating in a second direction in the data bus fiber from the tap coupler, and a power splitter fiber optic coupler formed to couple optical signals between the first and second lengths of the tap fiber such that signals coupled into either of the first and second lengths of the tap fiber are divided therebetween, the power splitter fiber optic coupler being between the receiver and the tap fiber optic coupler.

The receiver of the bidirectional fiber optic data bus system according to the invention is preferably coupled to one of the first and second lengths of the tap fiber. The bidirectional fiber optic data bus system may further include a transmitter coupled to the other of first and second lengths of the tap fiber, the power splitter fiber optic coupler being between the transmitter and the tap fiber optic coupler for dividing signals from the transmitter between the first and second lengths of the tap fiber such that portions of signals from the transmitter impinge upon the tap coupler from opposite directions for bidirectional coupling into the data bus fiber.

The bidirectional fiber optic data bus system according to the invention may also further include a transmitter for supplying optical signals to the tap fiber and means for guiding optical signals from the transmitter to the tap coupler for bidirectional coupling into the data bus fiber.

The guiding means of the bidirectional fiber optic data bus system according to the invention may include a first length of the tap fiber extending from the tap coupler, a second length of the tap fiber extending from the tap coupler for guiding signals propagating in a second direction in the data bus fiber from the tap coupler, a cleaved end formed on the first length of the tap fiber, and a mirror formed on the cleaved end for reflecting optical signals from the data bus fiber coupled by the tap coupler into the first length of the tap fiber back toward the tap coupler for transmission of a portion of the reflected signal into the second length of the tap fiber for propagation to the receiver.

The bidirectional fiber optic data bus system may include transceiver means for transmitting and receiving optical signals in the tap fiber. The transceiver means preferably includes a light emitting diode.

The tap coupler included in the invention preferably is formed to have a coherent molecular bond between the data bus fiber and the tap fiber.

The method according to the invention for forming a bidirectional fiber optic data bus system for coupling optical signals propagating in a data bus fiber into a receiver and for bidirectional transmission of signals from a transmitter, comprises the steps of forming a tap fiber optic coupler to couple optical signals between the data bus fiber and a tap fiber, coupling a receiver to the tap fiber to receive optical signals therefrom, and guiding a portion of a signal incident upon the tap fiber optic coupler from either of two opposite directions in the data bus fiber to the receiver.

The method for forming a bidirectional fiber optic data bus system may further include the step of extending a first length of the tap fiber from the tap coupler for guiding signals propagating in a first direction in the data bus fiber from the tap coupler, extending a second length of the tap fiber from the tap coupler for guiding signals propagating in a second direction in the data bus fiber from the tap coupler, and forming a power splitter fiber optic coupler to couple optical signals between the first and second lengths of the tap fiber such that signals coupled into either of the first and second lengths of the tap fiber are divided therebetween, the power splitter fiber optic coupler being between the receiver and the tap fiber optic coupler.

The method according to the invention may also further include the steps of coupling the receiver to one of the first and second lengths of the tap fiber, coupling a transmitter to the other of first and second lengths of the tap fiber, and placing the power splitter fiber optic coupler being between the transmitter and the tap fiber optic coupler for dividing signals from the transmitter between the first and second lengths of the tap fiber such that portions of signals from the transmitter impinge upon the tap coupler from opposite directions for bidirectional coupling into the data bus fiber.

The method according to the invention for forming the bidirectional fiber optic data bus system may additionally include the steps of supplying optical signals to the tap fiber with a transmitter and guiding optical signals from the transmitter to the tap coupler for bidirectional coupling into the data bus fiber.

The method of the invention may further include the steps of extending a first length of the tap fiber from the tap coupler extending a second length of the tap fiber from the tap coupler for guiding signals propagating in a second direction in the data bus fiber from the tap coupler cleaving the first length of the tap fiber to form an end thereon, and forming a mirror on the cleaved end for reflecting optical signals from the data bus fiber coupled by the tap coupler into the first length of the tap fiber back toward the tap coupler for transmission of a portion of the reflected signal into the second length of the tap fiber for propagation to the receiver.

The invention may also further include the steps of forming a power splitter fiber optic coupler in the tap fiber, connecting a transmitter to supply optical signals to the power splitter such that signals from the transmitter are guided to impinge upon the tap coupler for coupling into the data bus fiber in a first direction and to reflect from the mirror back to the tap coupler for coupling into the data bus fiber in a second direction, and connecting the receiver being to the power splitter to receive a portion of signals coupled into the tap fiber.

The method according to the invention may also include transmitting and receiving optical signals in the tap fiber with a single transceiver device such as light emitting diode.

The method for forming a bidirectional fiber optic data bus system according to the invention may also include forming the tap coupler to have a coherent molecular bond between the data bus fiber and the tap fiber.

BRIEF DESCRIPTION OF THE DRAWINGS

FIG. 5 schematically illustrates a second embodiment of a bidirectional fiber optic data bus tap according to the invention;

FIG. 8 schematically illustrates holding a pair of optical fibers in a jig to form an optical coupler;

FIG. 9 schematically illustrates the application of a laser beam to the juncture of the fibers of FIG. 8 to fuse them together to form a coherent molecular bond; and FIG. 10 illustrates an optical fiber being lapped to form an optically flat surface thereon.

DESCRIPTION OF THE PREFERRED EMBODIMENT

Figure 1:
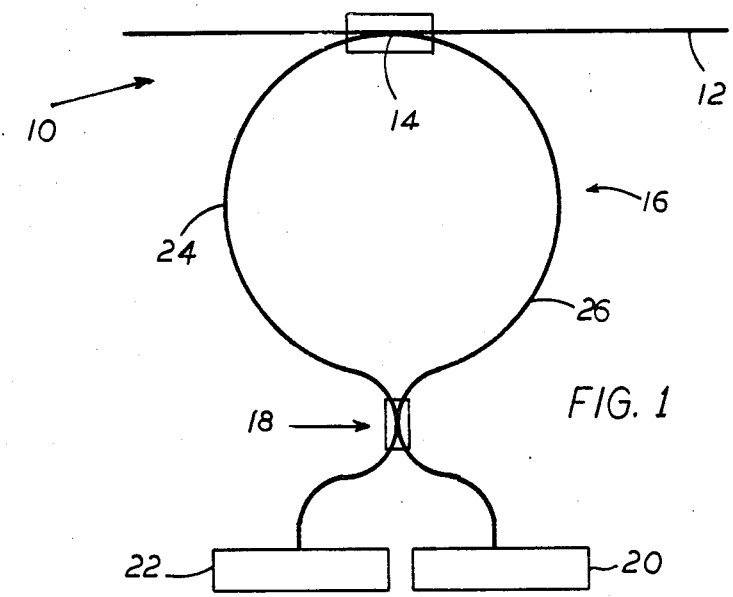
FIG. 1 schematically illustrates the general concept of a bidirectional fiber optic data bus tap according to the invention.

Referring to FIG. 1, a fiber optic data bus tap 10 is connected to a fiber optic data bus 12. The fiber optic data bus tap 10 includes a tap coupler 14, a tap fiber 16, a power splitter 18, a receiver 20 and a transmitter 22. The ensuing description of fiber optic data bus tap 10 assumes that fiber optic data bus 12 and tap fiber are multimode optical fibers; however, the invention is not restricted to the use of such fibers since single mode fibers will provide satisfactory performance for some applications of the invention. Both multimode and single mode optical fibers are commercially available from a variety of well known sources. A fiber optic data bus may be formed from multimode graded index cable having a cladding diameter of 140μ and a core diameter of 100μ. Such fiber is available from commercial vendors such as Corning and Optical Cable Corporation.

The tap coupler 14 couples a portion of a signal propagating in the fiber optic data bus 12 from right to left as viewed in FIG. 1 into a leg 24 of the tap fiber 16. The tap coupler preferably has a coupling efficiency in the range of about 2% to 4%. Therefore, little energy is removed from the data bus at each tap location. The coupled signal then propagates through the leg 24 to the power splitter 18, which is also a fiber optic coupler. The power splitter 18 couples a portion of the signal incident thereon from the leg 24 into a leg 26 of the tap fiber 16, which then directs the signal to the receiver 20. The power splitter 18 also transmits the portion of the signal, that is not cross coupled into the leg 26 to the transmitter 22. The power splitter 18 preferably has a coupling efficiency of 50% so that equal portions of the signal from the data bus are cross coupled to the receiver 20 and guided to the transmitter 22.

The tap coupler 14 couples a portion of a signal propagating in the fiber optic data bus 12 from left to right as viewed in FIG. 1 into the leg 26 of the tap fiber 16. A portion of the signal from the data bus is then transmitted to the receiver 20, and a portion of the signal is cross coupled from the leg 26 into the leg 24. Therefore, the fiber optic data bus tap 10 directs a portion of signals propagating in either direction in the data bus 12 to the receiver 20. A signal from the transmitter 22 is propagated in the leg 24 to the tap coupler to the power splitter 18, which then divides the signal from the tansmitter 22 between the legs 24 and 26 of the tap fiber 16.

Both the transmitted signals in the legs 24 and 26 propagate to the tap coupler 14. The tap coupler 14 then couples both transmitted signals into the data bus 12. Because of the directional nature of the coupling process, the signal from leg 24 travels from left to right in the data bus 12 and the signal from the leg 26 travels from right to left in the data bus 12. Therefore, signals from the transmitter 22 propagate in both directions in the data bus 12. The system thus provides bidirectional transmission and reception of data. If only sampling of the data carried by the data bus is desired, the transmitter 22 may be omitted and only the receiver 20 need be included in the system.

Referring to FIG. 5, there is shown a fiber optic bidirectional data bus tap 28 that is more compact that the embodiment fiber optic bidirectional data bus tap 10 of FIG. 1. The fiber optic bidirectional data bus tap 28 is connected to a data bus 30 and preferably includes a tap coupler 31, a first tap fiber 32, an end mirror 34 mounted to one end of the tap fiber 32, a fiber connector 36, a power splitter 38, a second tap fiber 40, a receive fiber 42, a transmitter 44 and a receiver 46. The fiber optic bidirectional data bus tap 28 thus requires only one leg to carry signals to and from data bus 30.

Use of mirror 34 instead of a second leg of optical fiber permits the construction of a very compact data bus tap, which may be molded into the main bus cable. There are several known methods for forming end mirror 34. One preferred method is to press a cleaved fiber end against a thin gold foil and then to place an adhesive on the foil around the fiber end. If the fiber is pulled away from the foil after the adhesive cures, a small dot of gold will adhere to the end of the fiber. Such mirrors generally reflect about 90% of the light incident thereon.

The tap coupler 31 couples a portion of light signals propagating form left to right in the data bus 30 into the tap fiber 32. The tap fiber 32 may be spliced end-to-end with a fiber 48 mounted between the tap fiber 32 and the connector 48. The power splitter, which preferably is a 50% fiber optic coupler, is formed to couple optical signals between the tap fiber 40 and the receive fiber 46. The tap fiber 40 is connected to the connector 36 to provide transmission of optical energy from the tap coupler 31 to the power splitter 38. The power splitter 38 couples part of the signal received from the data bus 30 to the receiver 46 and sends part of the signal to the transmitter 44.

A signal propagating from right to left in the data bus 30 couples into the tap fiber 32 and then impinges upon the fiber end mirror 34. The signal then reflects from the mirror 34 and propagates back toward the tap coupler 31. The tap coupler 31, like the tap coupler 14, preferably has a coupling efficiency of about 2%-4%. Therefore, 96% to 98% of the reflected signal is transmitted through the tap coupler 31 toward the power splitter 38, which divides the signal from the data bus between the receiver 46 and the transmitter 44 as described above.

The power splitter 38 couples half of the output of the transmitter 44 to a free end 50 of the receive fiber 42. This free end 50 is preferably terminated with a light absorber (not shown) since the light supplied thereto is not needed. Half of the signal from the transmitter 44 propagates through the power splitter 38, the connector 36 and the fibers 48 and 32 to the tap coupler 31. The tap coupler 31 then couples 2% to 4% of the transmitter output into the data bus 30 as a right to left propagating signal. The remainder of the transmitter output is incident upon the mirror 34, which reflects the light back toward the tap coupler 31 where 2% to 4% of the reflected light is coupled into the data bus 30 as a left to right propagating signal. Thus the fiber optic data bus tap 28 provides bidirectional reception and transmission of data.

Figure 6:
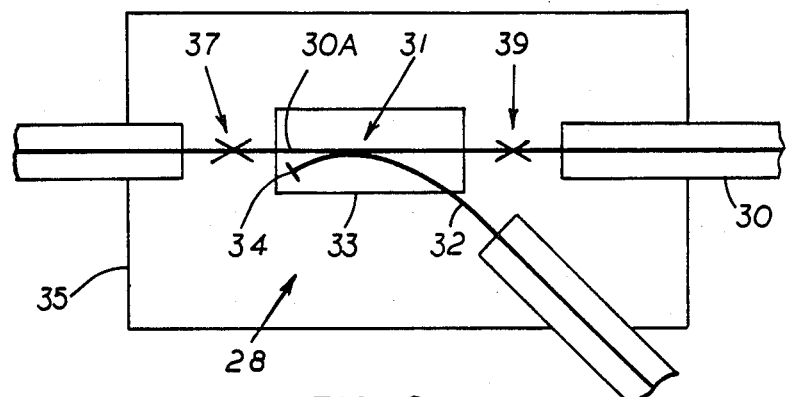
FIG. 6 illustrates potting of a tap coupler included in the bidirectional fiber optic data bus tap of FIG. 5.

The embodiment of the invention shown in FIG. 5 facilitates potting of the tap coupler 31 to protect it from mechanical stresses and to preserve the preset coupling and transmission characteristics. Referring to FIG. 6, the tap coupler 31 may be formed with the tap fiber 32 and a fiber 30A having core and cladding diameters and light propagation characteristics substantially identical to those of the data bus fiber 30. The fibers 30A and 32 may be relatively short in length compared to the data bus fiber 30.

Referring to FIG. 6, the fiber optic data bus tap 28 is formed by cleaving the data bus fiber 30 and splicing the ends of the fiber 30A to the exposed ends of the cleaved data bus fiber 30 at a pair of splice points 37 and 39. The coupler 31, the splice points 37 and 39 and a portion of the tap fiber 32 adjacent the coupler may then be encased in a soft rubber compound 33 and then potted in a hard rubber or plastic material 35.

Completion of the fiber optic data bus tap 28 involves connecting the tap fiber 32 to the fiber connector 36 as shown in FIG. 5. If a sufficient length of the tap fiber 32 extends from the coupler 31, the tap fiber 32 may be directly mounted in the connector. However, in general, the distance between the fiber optic data bus tap 28 and the receiver 46 may necessitate mounting one end of the fiber 48 in the connector 36 and splicing the other end of the fiber 48 to the tap fiber 32.

Figure 7:
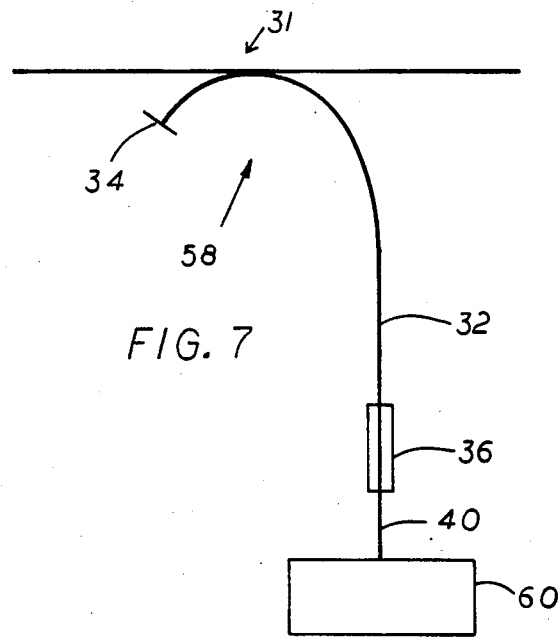
FIG. 7 schematically illustrates a third embodiment of a bidirectional fiber optic data bus tap according to the invention.

Referring to FIG. 7, a fiber optic data bus tap 58 has a single light emitting diode (LED) 60 used as both an optical source for a transmitter and as a detector on a time shared basis. The fiber optic data bus tap 58 is similar to the fiber optic data bus tap 28 except that no power splitter is included. The system may use light having a wavelength of 850 nm from a commercially available LED source. The power splitters 18 and 38 each produce a 3 dB loss in the fiber optic data bus taps 10 and 28, respectively.

All of the optical couplers 14, 18, 31 and 38 included in the various embodiments of the invention described above are preferably constructed according to the method described below. The following described steps for forming optical couplers refers only to the coupler 14 for simplicity.

Figure 2:
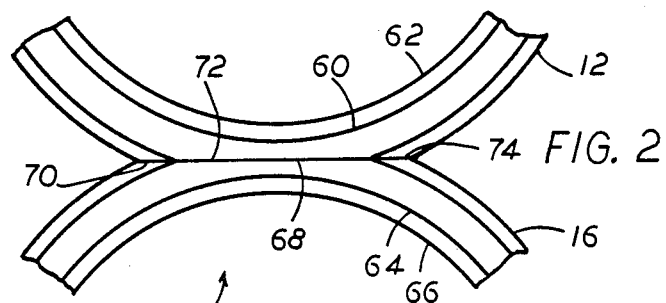
FIG. 2 schematically illustrates the structural features of a coupler included in the bidirectional fiber optic data bus tap of FIG. 1.
Figure 4:
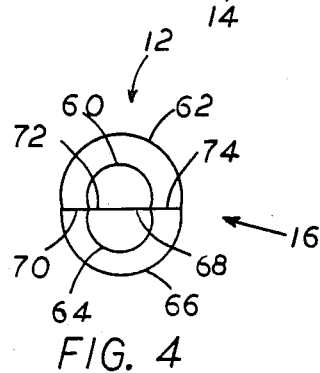
FIG. 4 shows the configuration of planar surfaces formed in the core and cladding of the optical fibers included in the fiber optic coupler of FIGS. 2 and 3.
Figure 3:
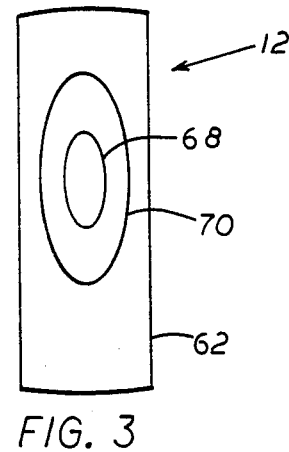
FIG. 3 is an end view of the fiber optic coupler of FIG. 2.

As illustrated in FIGS. 2-4, the tap coupler 14 includes the pair of optical fibers 12 and 16 bonded together. The fiber 12 has a core 60 and a cladding 62 surrounding the core 60. The fiber 16 has a core 64 and a cladding 66 surrounding the core 60. A length of the fiber 12 is stripped of its outer jacketing material and then lapped to form optically flat surfaces 68 and 70 in the core 60 and the cladding 62, respectively. Similarly, a length of the fiber 16 is stripped of its outer jacketing material and then lapped to form optically flat surfaces 72 and 74 in the core 64 and the cladding 66, respectively. The core surfaces 68 and 72 are generally oval shaped, and the cladding surfaces 70 and 74 have generally oval shaped outer and inner boundaries. The inner boundaries of the cladding surfaces 70 and 74 surround the perimeters of the core surfaces 68 and 72, respectively.

Referring to FIG. 8, fibers 12 and 16 are preferably mounted with a suitable adhesive on a pair of convexly curved substrates 73 and 75, respectively, before lapping. The substrates 73 and 75 may be made of any generally rigid material, such as glass, metal or plastic. The radii of curvature of the substrates 73 and 75 preferably are identical and are sufficiently large to preclude the risk of fracturing the fibers as they are bent to conform to the curvature.

The fibers 12 and 16 are lapped to predetermined depths to form the coupler 14 to have a desired coupling efficiency. The central portions of the fibers 12 and 16 may be lapped using conventional lapping methods to a predetermined depth to remove cladding material therefrom and form the core surfaces 68 and 72 and the cladding surfaces 72 and 74. The planar surfaces should be sufficiently flat that they tend to adhere to one another when they are placed together with no adhesive or index matching oil therebetween.

A lapping technique that has been found to be advantageous in forming the planar surfaces 68 and 70 to be optically flat is illustrated in FIG. 10. The fiber 12 is shown mounted on the substrate 73, which is connected to a retainer 75 by any suitable means, such as clamping or gluing. The retainer 75 is supported on a shaft 77 that extends from a motor 79, which controls the elevation of the shaft 79 and retainer 77 relative to an optically flat lapping surface 81. The lapping begins with the central portion of the convexly curved fiber 12 being tangent to the lapping surface 81. As the lapping proceeds, the motor 79 oscillates the fiber 12 across the lapping surface 81 and lowers the shaft 77, the retainer 75 and the substrate 73 with the fiber 12 attached thereto such that the planar surfaces 68 and 70 are formed by lapping radially inward from the point of initial contact between the fiber 12 and the lapping surface 81.

A preferred method for determining the depth to which the fiber is lapped is to apply an optical signal to one end thereof from a laser 83 and to monitor the optical output at the other end with a photodetector 85. A lapping slurry having a refractive index near that of the fiber 12 is maintained on the lapping surface 81 during the lapping process. As the lapping proceeds, light couples from the fiber 12 into the lapping slurry, thereby reducing the optical throughput of the fiber 12. The optical throughput may be correlated to the lapping depth. In general, the relation between the optical throughput and lapping depth depends upon the specific type of fiber being lapped. Therefore, it is necessary to perform a series of measurements of the lapping depth as a function of optical throughput to produce a calibration curve for the particular fiber being lapped and the lapping slurry used therewith.

The exposed core surfaces 68 and 72 preferably have substantially identical dimensions. The dimensions of the core surface 68 and the cladding surface 70 are determined by the diameters of the core 60 and cladding 62 of the fiber 12 and the depth to which fiber optic material is removed therefrom. Similarly, the dimensions of the core portion 72 the cladding portion 74 are determined by the diameters of the core 64 and cladding 66 of the fiber 16 and the depth to which fiber optic material is removed therefrom.

The amount of fiber optic material removed from the fibers 12 and 16 increases gradually from zero at the edges of the oval shaped cladding surfaces 70 and 74, respectively, to a maximum at the centers of the core surfaces 68 and 72, respectively. Tapered removal of fiber optic material enables the fiber 12 and 16 to converge and diverge gradually, which is advantageous for avoiding backward reflections and excessive signal loss at the interaction region 76.

After completion of the lapping processes, the exposed core portions 68 and 72 and the cladding portions 70 and 74, are juxtaposed in facing relationship. The juxtaposed core surfaces 68 and 72 form an interaction region 76 where light couples between the fibers 12 and 16 at the interface between the two cores 60 and 64. The fibers 12 and 16 are then joined, preferably by a bonding method that forms a coherent molecular bond between the exposed core portions 68 and 72 and the cladding portions 70 and 74.

Referring to FIGS. 8 and 9, the substrates 73 and 75 with the fibers 12 and 16, respectively, mounted thereon preferably are placed in a jig 89 to facilitate manipulation into position for bonding. Jig 89 preferably includes a pair of substrate holders 89A nd 89B for holding the substrates 73 and 75, respectively, in position for bonding fibers 12 and 16. The substrate holders 89A and 89B hold the substrates 73 and 75, respectively so that they are movable with respect to one another. The substrates 73 and 75, are placed in desired positions relative to one another and then the fibers 12 and 16 are bonded together. Ordinarily, the fibers 12 and 16 will be positioned to maximize the coupling of optical signals therebetween.

The coupling efficiency of the coupler 14 is preferably monitored while fibers 12 and 16 are being positioned to form the coupler 14. A preferred method for monitoring the coupling efficiency is to introduce light into one end of fiber 12 with a light source such as a laser 100 and to measure the intensity of light transmitted by fiber 12 to a photodetector 102 at the other end thereof. A photodetector 104 may be used to detect the intensity of light coupled into fiber 16. The coupling efficiency is $$\Theta = -I_t/I_i = I_c(I_t+I_c)^{-1},$$

where $\Theta$ is the coupling efficiency, $I_i$ is the light intensity input to fiber 12, $I_t$ is the light transmitted through fiber 12 beyond the interaction region 76 and $I_c$ is the light intensity coupled from fiber 12 to fiber 16.

Referring to FIG. 9, heat is applied to the fibers 12 and 16 while they are held together. The heat source is preferably a $CO_2$ laser 106 that is set to apply energy to the fibers 12 and 16 to heat them to the glass transition temperature, which is below the melting temperature. The glass transition temperature of an optical fiber varies with the type of fiber, but is generally in the range of 1100° C. to 1200° C. Other energy sources (not shown) such as ultrasonic waves may be used to supply the energy required to fuse the fibers 12 and 16.

Laser 106 is preferably a $CO_2$ laser, and it should produce an output beam that will heat the fibers 12 and 16 to a temperature near the glass transition temperature. The energy source may also be an ultrasonic wave generator, an induction heating source or other suitable device for providing the desired amount of heat to the fibers 12 and 16. As shown in FIGS. 8 and 9, a force F may be applied to compress the fibers 12 and 16 together during the bonding process. Generally it has been found that a compressive force of about a pound facilitates formation of the coherent molecular bond.

The transition temperature is below the melting point of the glass from which the fibers 12 and 16 are formed. The transition temperature depends upon the materials comprising the fibers 12 and 16. Most optical fiber is formed from silicon dioxide with a dopant such as germanium dioxide or boron added thereto to control the refractive index. Such fibers typically have transition temperatures in the range of 1100° C. to 1200° C. The transition temperature should be determined experimentally for the fibers to be joined, and the energy output from the laser 98 should be contolled to assure that the temperature in the bonded region does not exceed the transition temperature. The transition temperature of an optical fiber is attained when the fiber begins to soften as the temperature increases.

Applying the output of the laser 106 over the juncture of the the fibers 12 and 16 together. It has been found that the above described method forms a junction of the 12 and 16 that results in a coherent molecular bonded region having the same physical structure and the same optical characteristics as the bulk material comprising fibers 12 and 16.

The substrates 73 and 75 also facilitate application of force between the fibers 12 and 16 during the bonding process. It has been found that pressing the fibers 12 and 16 together with a force of about a pound enhances the formation of a coherent molecular bond between the fibers 12 and 16. The coherent molecular bond fuses the fibers 12 and 16 together without changing the molecular arrangement thereof in the bonded region. Therefore, the refractive indices of the fibers 12 and 16 are essentially unchanged during the bonding process, thereby eliminating undesirable reflections and refractions, which cause insertion loss, at the interaction region 76.

Couplers formed according to the above described method have been cut into sections and examined with high power microscopes and a mireau interferometer. These instruments show that the bond interface has no distortion of the moleular arrangements of the cores or the claddings of the fibers and that the molecular structure of the interface is identical to that of the fibers.

What is claimed is:

1. A bidirectional fiber optic data bus system for bidirectional coupling of optical signals propagating in a data bus fiber into a receiver and for bidirectional transmission of signals from a transmitter, comprising:
   a tap fiber;
   a tap fiber optic coupler formed to couple about 2% to 4% of optical signals from the data bus fiber into the tap fiber;
   transmitting means for transmitting optical signals;
   receiving means for receiving optical signals;
   means for splitting the power of the light propagating from the transmitting means to the tap fiber or from the tap fiber to the receiving means into two equal portions, the power splitting means further comprising means for guiding a portion of a signal incident upon the tap fiber optic coupler from either of two opposite directions in the data bus fiber to the receiving means, the guiding means including:
   a first length of the tap fiber extending from the tap coupler:
   a second length of the tap fiber extending from the tap coupler for guiding signals propagating in a second direction in the data bus fiber from the tap coupler;

a cleaved end formed on the first length of the tap fiber; and a mirror formed on the cleaved end for reflecting optical signals from the data bus fiber coupled by the tap coupler into the first length of the tap fiber back toward the tap coupler for transmission of a portion of the reflected signal into the second length of the tap fiber for propagation to the receiving means.

2. The bidirectional fiber optic data bus system of claim 1, wherein the transmitting means further includes:

means for supplying optical signals to the power splitting means, such signals from the transmitting means are guided to impinge upon the tap coupler for coupling into the data bus fiber in a first direction and to reflect from the mirror back to the tap coupler for coupling into the data bus fiber in a second direction.

3. The bidirectional fiber optic data bus system of claim 1, further including means for transmitting and receiving optical signals in the tap fiber.

4. The bidirectional fiber optic data bus system of claim 3, wherein the transmitting and receiving means includes a light emitting diode.

5. The bidirectional fiber optic data bus system of claim 1 wherein the tap coupler includes a coherent molecular bond between the data bus fiber and the tap fiber.

6. A bidirectional fiber optic data bus system for bidirectional coupling of optical signals propagating in a data bus fiber into a receiver and for bidirectional transmission of signals from a transmitter, comprising:

a tap fiber;

a tap fiber optic coupler formed to couple optical signals from the data bus fiber into the tap fiber;

transmitting means for transmitting optical signals;

receiving means for receiving optical signals;

means for splitting the power of the light propagating from the transmitting means to the tap fiber or from the tap fiber to the receiving means into two equal portions, the power splitting means further comprising means for guiding a portion of a signal incident upon the tap fiber optic coupler from either of two opposite directions in the data bus fiber to the receiving means, the guiding means including:

a first length of the tap fiber extending from the tap coupler;

a second length of the tap fiber extending from the tap coupler for guiding signals propagating in a second direction in the data bus fiber from the tap coupler;

a cleaved end formed on the first length of the tap fiber; and a mirror formed on the cleaved end for reflecting optical signals from the data bus fiber coupled by the tap coupler into the first length of the tap fiber back toward the tap coupler for transmission of a portion of the reflected signal into the second length of the tap fiber for propagation to the receiving means.

7. A method of forming a bidirectional fiber optic data bus system for bidirectional coupling of optical signals propagating in a data bus fiber into a receiver and for bidirectional transmission of signals from a transmitter, comprising:

providing a tap fiber;

forming a tap fiber optic coupler to couple optical signals between the data bus fiber and the tap fiber;

providing a transmitting means;

providing a receiving means;

splitting the power of the light propagating from the transmitting means to the tap fiber or from the tap fiber to the receiving means;

extending a first length of the tap fiber from the tap coupler;

extending a second length of the tap fiber from the tap coupler for guiding signals propagating in a second direction in the data bus fiber from the tap coupler;

forming a mirror on the cleaved end for reflecting optical signals from the data bus fiber coupled by the tap coupler into the first length of the tap fiber back toward the tab coupler for transmission of a portion of the reflected signal into the second length of the tap fiber for propagation to the receiving means.

8. The method of claim 7, further including the steps of:

coupling the receiving means to one of the first and second lengths of the tap fiber;

coupling a transmitting means to the other of first and second lengths of the tap fiber; and placing the power splitter means between the transmitter and the tap fiber optic coupler for dividing signals from the transmitting means between the first and second lengths of the tap fiber such that portions of signals from the transmitting means impinge upon the tap coupler from opposite directions for bidirectional coupling into the data bus fiber.

9. The method of claim 7, wherein the step of providing a transmitter means further includes the steps of:

supplying optical signals to the power splitting means, such that signals from the transmitting means are guided to impinge upon the tap coupler for coupling into the data bus fiber in a first direction and to reflect from the mirror back to the tap coupler for coupling into the data bus fiber in a second direction; and connecting the receiving means to the power splitting means to receive a portion of signals coupled into the tap fiber.

10. The method of claim 7, further including transmitting and receiving optical signals in the tap fiber with a single transceiver device.

11. The method of claim 7, further including transmitting and receiving optical signals in the tap fiber with a light emitting diode.

12. The method of claim 7 wherein the step of forming the tap coupler includes the step of forming a coherent molecular bond between the data bus fiber and the tap fiber.

* * * * *